US012695279B2

(12) United States Patent
Yang et al.

(10) Patent No.: US 12,695,279 B2
(45) Date of Patent: Jul. 28, 2026

(54) INTEGRATED CABLE PROCESSING DEVICE

(71) Applicant: Tyco Electronics (Shanghai) Co., Ltd., Shanghai (CN)

(72) Inventors: An (Joshua) Yang, Shanghai (CN); Lvhai (Samuel) Hu, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 732 days.

(21) Appl. No.: 17/732,924

(22) Filed: Apr. 29, 2022

(65) Prior Publication Data

US 2022/0351881 A1 Nov. 3, 2022

(30) Foreign Application Priority Data

Apr. 29, 2021 (CN) .......................... 202110471599.7

(51) Int. Cl.
| | |
|---|---|
| *H02G 1/12* | (2006.01) |
| *H01B 13/08* | (2006.01) |
| *H01R 43/28* | (2006.01) |
| *H02G 1/14* | (2006.01) |
| *H01B 13/02* | (2006.01) |

(Continued)

(52) U.S. Cl.
CPC ........... *H02G 1/1256* (2013.01); *H01R 43/28* (2013.01); *H02G 1/1248* (2013.01); *H02G 1/14* (2013.01); *H01B 13/0207* (2013.01); *H01B 13/0858* (2013.01); *H01B 13/2606* (2013.01); *H02G 1/005* (2013.01)

(58) Field of Classification Search
CPC ...... H02G 1/1248; H02G 1/1256; H02G 1/14; H02G 1/005; H01R 43/28; H01B 13/0207; Y10T 29/53243
See application file for complete search history.

(56) References Cited

U.S. PATENT DOCUMENTS

| | | | | | |
|---|---|---|---|---|---|
| 3,927,590 | A | * | 12/1975 | Gudmestad | ............ H01R 43/28 |
| | | | | | 83/175 |
| 4,512,828 | A | * | 4/1985 | Helm | ........................ H02G 1/14 |
| | | | | | 156/49 |
| 9,416,488 | B2 | * | 8/2016 | Stier | .................. H01B 13/0207 |

(Continued)

FOREIGN PATENT DOCUMENTS

JP 2020058181 A * 4/2020

OTHER PUBLICATIONS

Jishad et al, "Obstacle Avoidance Mechanism for Transmission Line Inspection Robot," 2019 2nd International Conference on Intelligent Computing, Instrumentation and Control Technologies (ICICICT), Kannur, India, 2019, pp. 1136-1139. (Year: 2019).*

*Primary Examiner* — A. Dexter Tugbang

(74) *Attorney, Agent, or Firm* — Barley Snyder

(57) ABSTRACT

An integrated cable processing device for performing processing operations on a cable includes a frame defining a workbench, and a plurality of cable processing mechanisms provided on the workbench for performing different processing operations on the cable. A cable clamping assembly of the device is adapted to clamp the cable, and is movable relative to the plurality of cable processing mechanisms to successively move a sub segment to be processed of the clamped cable to each of the plurality of cable processing mechanisms, and each cable processing mechanism performs the corresponding processing operation on the sub segment.

19 Claims, 10 Drawing Sheets

(51) Int. Cl.
    *H01B 13/26*        (2006.01)
    *H02G 1/00*        (2006.01)

(56)          References Cited

U.S. PATENT DOCUMENTS

| | | | |
|---|---|---|---|
| 2002/0069519 A1* | 6/2002 | Erni | H01R 43/28 |
| | | | 29/745 |
| 2004/0060339 A1* | 4/2004 | Imai | Y10T 29/53243 |
| | | | 72/420 |
| 2015/0068267 A1* | 3/2015 | Winton, III | H02G 1/005 |
| | | | 72/338 |
| 2020/0346263 A1* | 11/2020 | Achinger | H01R 43/28 |

* cited by examiner

200

210

220

INTEGRATED CABLE PROCESSING DEVICE

CROSS-REFERENCE TO RELATED APPLICATIONS

This application claims the benefit of Chinese Patent Application No. CN202110471599.7 filed on Apr. 29, 2021 in the State Intellectual Property Office of China, the whole disclosure of which is incorporated herein by reference.

FIELD OF THE INVENTION

Embodiments of the present disclosure generally relate to cable processing, and more specifically, to an integrated cable processing device capable of performing a variety of processing operations on cables.

BACKGROUND

Cable is a wiring part connecting various electrical components in the circuit. The cable comprises a core conductor, a metal foil, a braid, an insulation layer and an outer sheath. It is often necessary to connect the cable to the connector or conductive terminal. This usually requires a variety of processing operations on the cable, such as stripping the outer sheath at the end of the cable, sparing the braid shielding layer, cutting off the metal foil, crimping the terminal or connector on the core conductor, etc. In the prior art, a processing operation is carried out at each separate processing equipment, which leads to complex and inconvenient execution of these processing operations and low degree of automation.

SUMMARY

According to an embodiment of the present disclosure, an integrated cable processing device for performing processing operations on a cable includes a frame defining a workbench, and a plurality of cable processing mechanisms provided on the workbench for performing different processing operations on the cable. A cable clamping assembly of the device is adapted to clamp the cable, and is movable relative to the plurality of cable processing mechanisms to successively move a sub segment to be processed of the clamped cable to each of the plurality of cable processing mechanisms, and each cable processing mechanism performs the corresponding processing operation on the sub segment.

BRIEF DESCRIPTION OF THE DRAWINGS

The invention will now be described by way of example with reference to the accompanying Figures, of which.

DETAILED DESCRIPTION OF THE EMBODIMENTS

Figure 1:
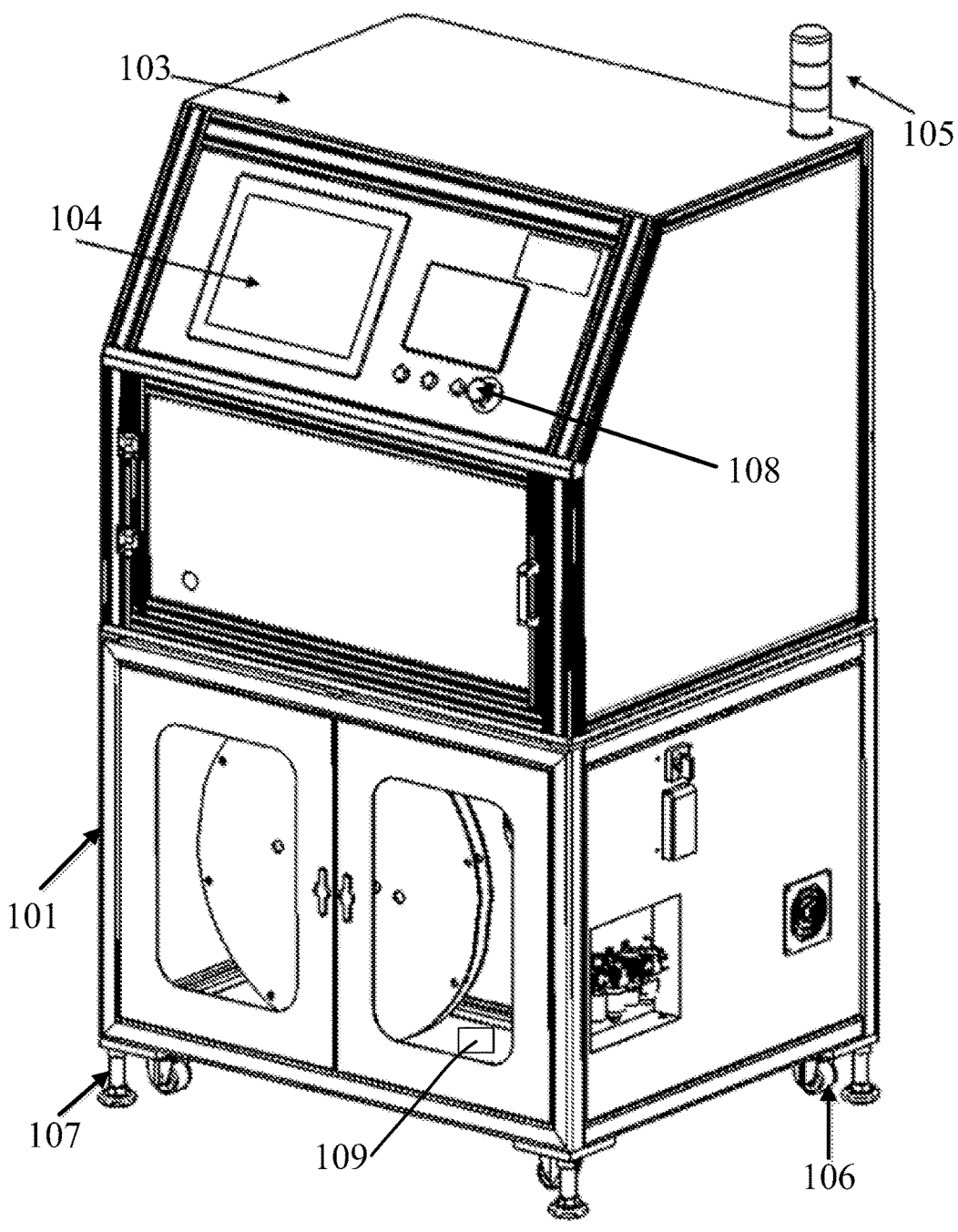
FIG. 1 is a perspective view schematically showing an integrated cable processing device according to an exemplary embodiment of the present disclosure.
Figure 2:
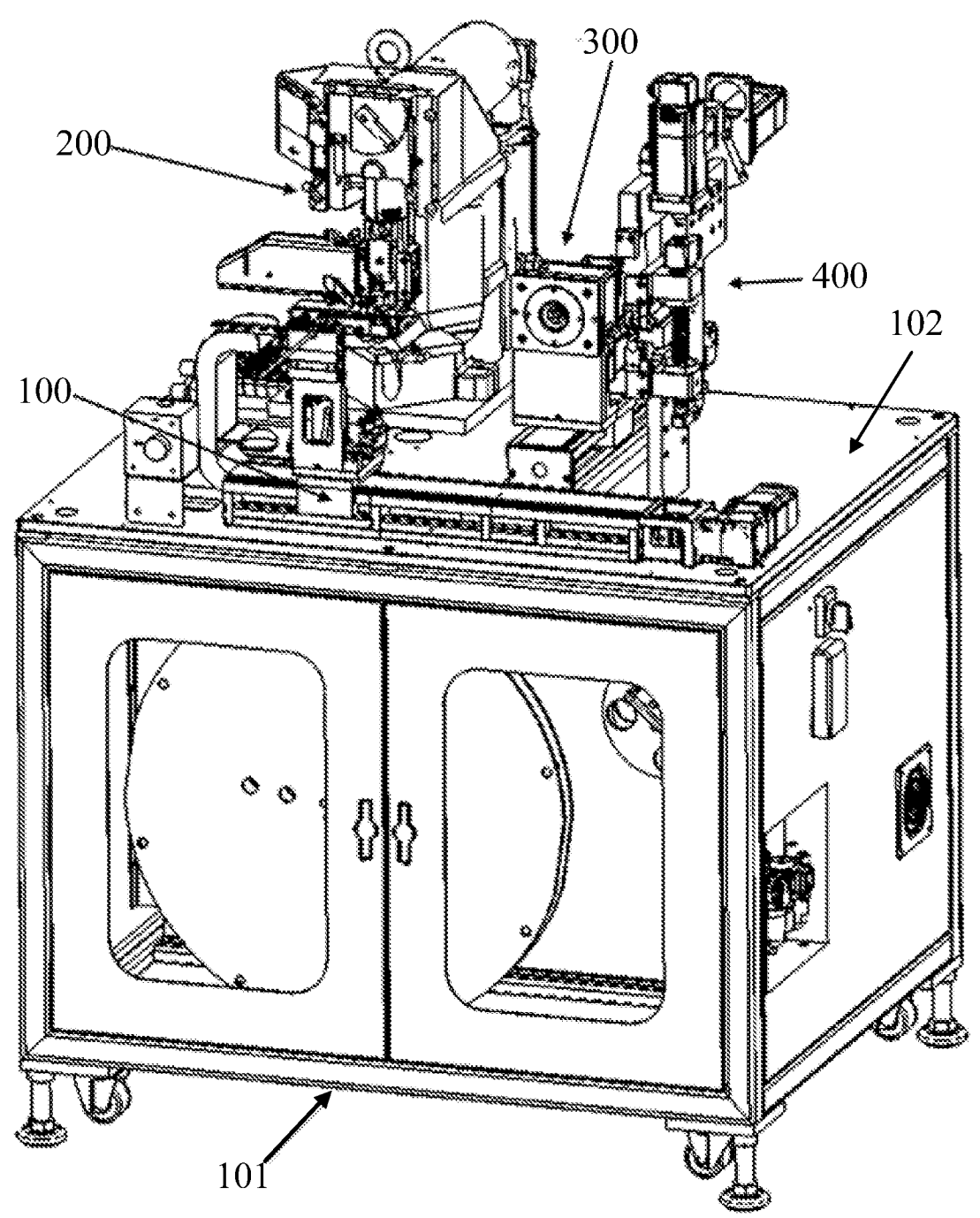
FIG. 2 is a perspective view schematically showing an integrated cable processing device according to an exemplary embodiment of the present disclosure, in which the cover is removed.
Figure 3:
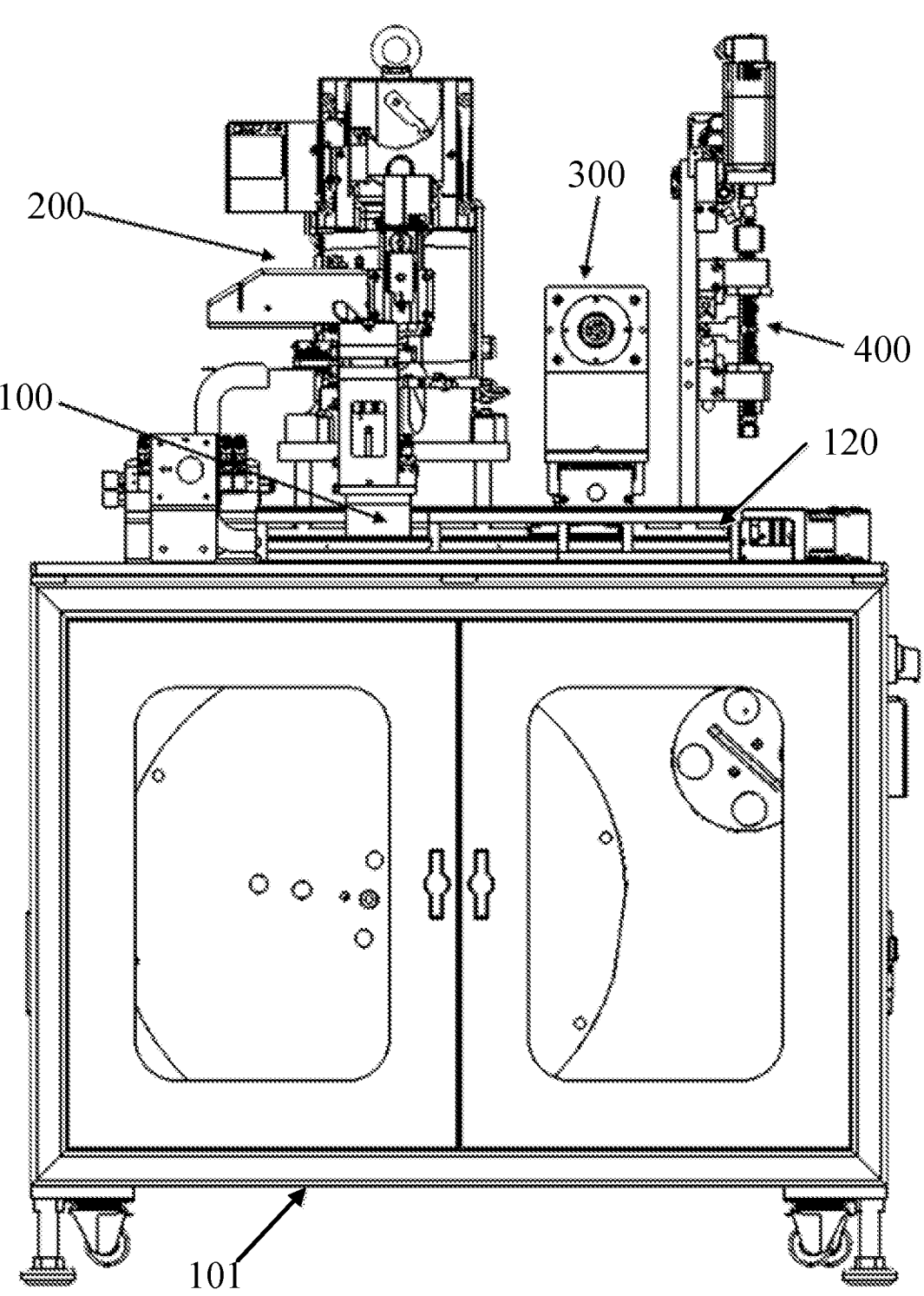
FIG. 3 is a side view schematically showing an integrated cable processing device according to an exemplary embodiment of the present disclosure, in which the cover is removed.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided an integrated cable processing device for performing a variety of processing operations on a cable. The integrated cable processing device comprises of: a frame defining a workbench; a plurality of cable processing mechanisms provided on the workbench and configured to respectively perform different processing operations on the cable; and a cable clamping assembly configured to clamp the cable. The cable clamping assembly is configured to be movable relative to the plurality of cable processing mechanisms to successively move a sub segment to be processed of the clamped cable to each of the plurality of cable processing mechanisms, and each cable processing mechanism performs the corresponding processing operation on the sub segment.

According to an exemplary embodiment of the present disclosure, there is provided an integrated cable processing device capable of performing a variety of processing operations on a cable. As shown in the figure, the integrated cable processing device includes a frame 101 defining a working face or a workbench 102. In some examples, the frame 101 is movable. For example, a roller 106 (see FIGS. 1-3 and 5) can be installed at the bottom of the frame 101 to be suitable for processing cables in different sites. In addition, as shown in FIGS. 1-3 and 5, an adjustable support 107 can also be provided at the bottom of the frame 101, which is used to modulate the levelness of the workbench 102, for example.

The integrated cable processing device also includes a plurality of cable processing mechanisms 200, 300 and 400 arranged on the workbench 102. As described below, the cable processing mechanisms can respectively perform different processing operations on the cable 10, such as crimping element, flaring braid, cutting and removing metal foil, etc. Further, the integrated cable processing device also includes a cable clamping assembly 100 for clamping the cable 10.

According to an exemplary embodiment of the present disclosure, the cable clamping assembly 100 can move relative to a plurality of cable processing mechanisms provided on the workbench 102, so as to move the sub segment 11 to be processed of the clamped cable 10 to one or more of the plurality of cable processing mechanisms, or each cable processing mechanism. The cable processing mechanism performs the corresponding processing operation on the sub segment 11. According to the actual processing requirements, the cable clamping assembly 100 may sequentially or randomly move the sub segment 11 to be processed of the cable 10 to the corresponding cable processing mechanism, for example, the cable processing sequence can be preset.

In the illustrated embodiment, as shown in FIGS. 2-5, 7 and 10, the cable clamping assembly 100 includes a cable clamping mechanism 110 and a first guide rail 120. The cable clamping mechanism 110 may clamp the cable 10 so that the sub segment 11 to be processed of the cable 10 faces (E. G., axially faces) the cable processing mechanism. For example, the sub segment 11 may be the part of the cable close to its end, and the cable clamping mechanism 110 can clamp the cable 10 at a predetermined distance from the end of the cable 10, so that the sub segment 11 has a predetermined length convenient for processing.

The first guide rail 120 is mounted on the workbench 102, and the cable clamping mechanism 110 is movably mounted on the first guide rail 120 and can be driven to move along the first guide rail 120, so as to move the sub segment 11 to be processed of the clamped cable 10 to the corresponding cable processing mechanism, such as to or near a cable processing position of the cable processing mechanism.

As an example, the first guide rail 120 may include a linear guide rail or a curved guide rail, such as an annular guide rail, which may depend on the arrangement of the cable processing mechanisms. Accordingly, the plurality of cable processing mechanisms may be arranged at intervals on the same side or different sides of the cable clamping assembly 100. In the illustrated embodiment, the first guide rail is linear and a plurality of cable processing mechanisms are arranged on the same side of the guide rail. It will be understood that the cable processing mechanism on the workbench can be appropriately increased or reduced according to the processing needs and/or space conditions.

In a further embodiment, the cable clamping mechanism 110 can rotate relative to the first guide rail 120, so that the orientation of the sub segment 11 to be processed of the clamped cable 10 can be easily adjusted according to the actual demand.

Figure 4:
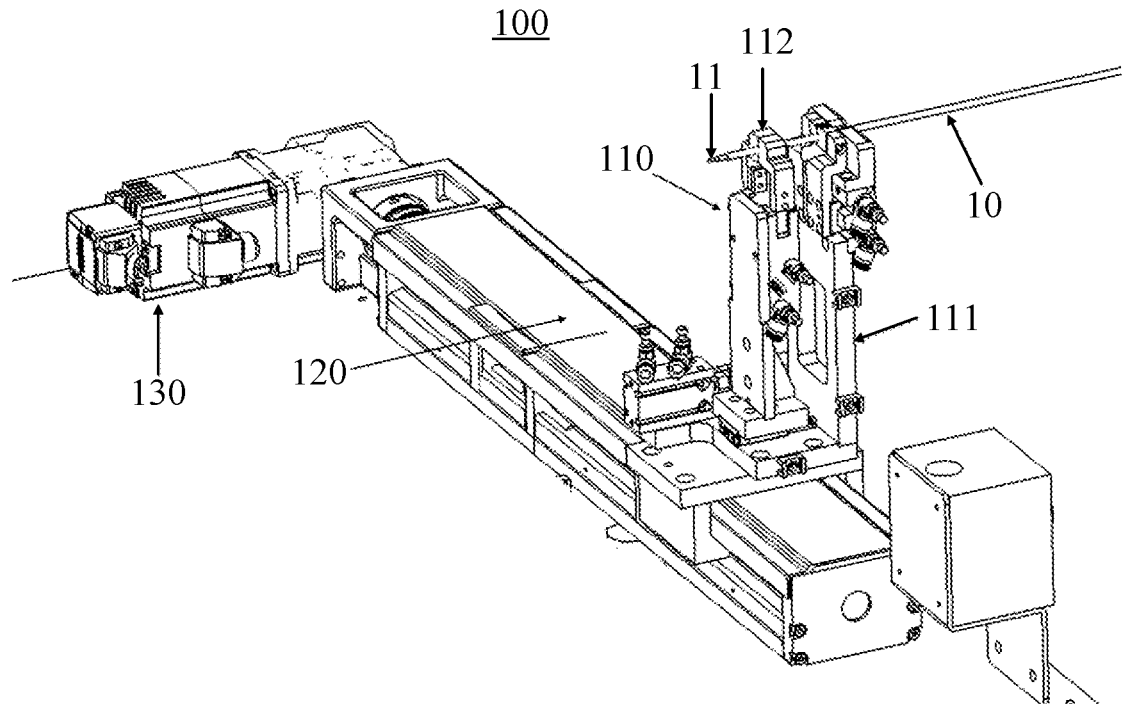
FIG. 4 is a perspective view schematically showing a cable clamping assembly of an integrated cable processing device according to an exemplary embodiment of the present disclosure.
Figure 5:
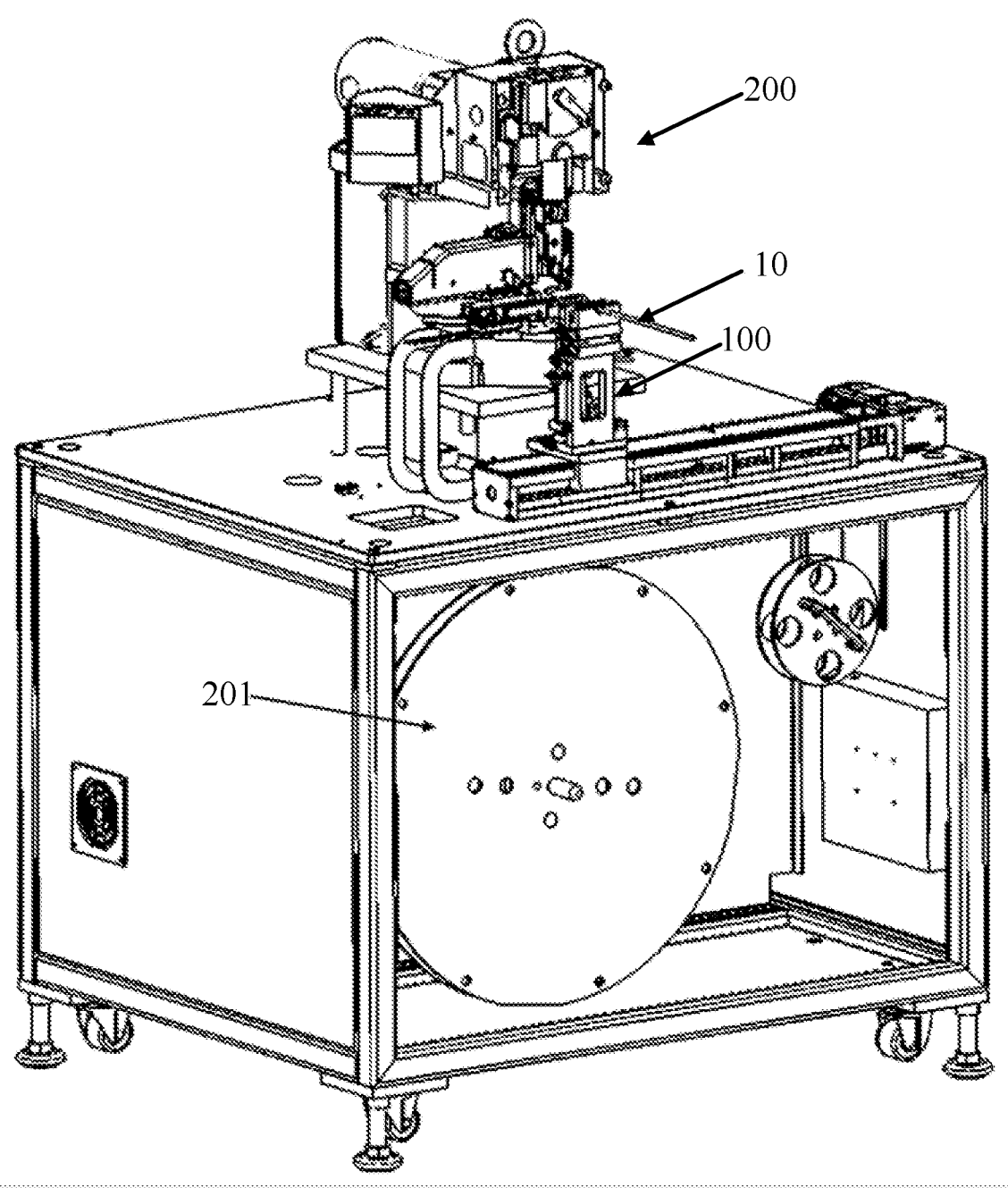
FIG. 5 is a perspective view schematically showing a partial structure of an integrated cable processing device according to an exemplary embodiment of the present disclosure, in which the cover is removed to show a cable clamping assembly and an element crimping mechanism aligned with each other.
Figure 6:
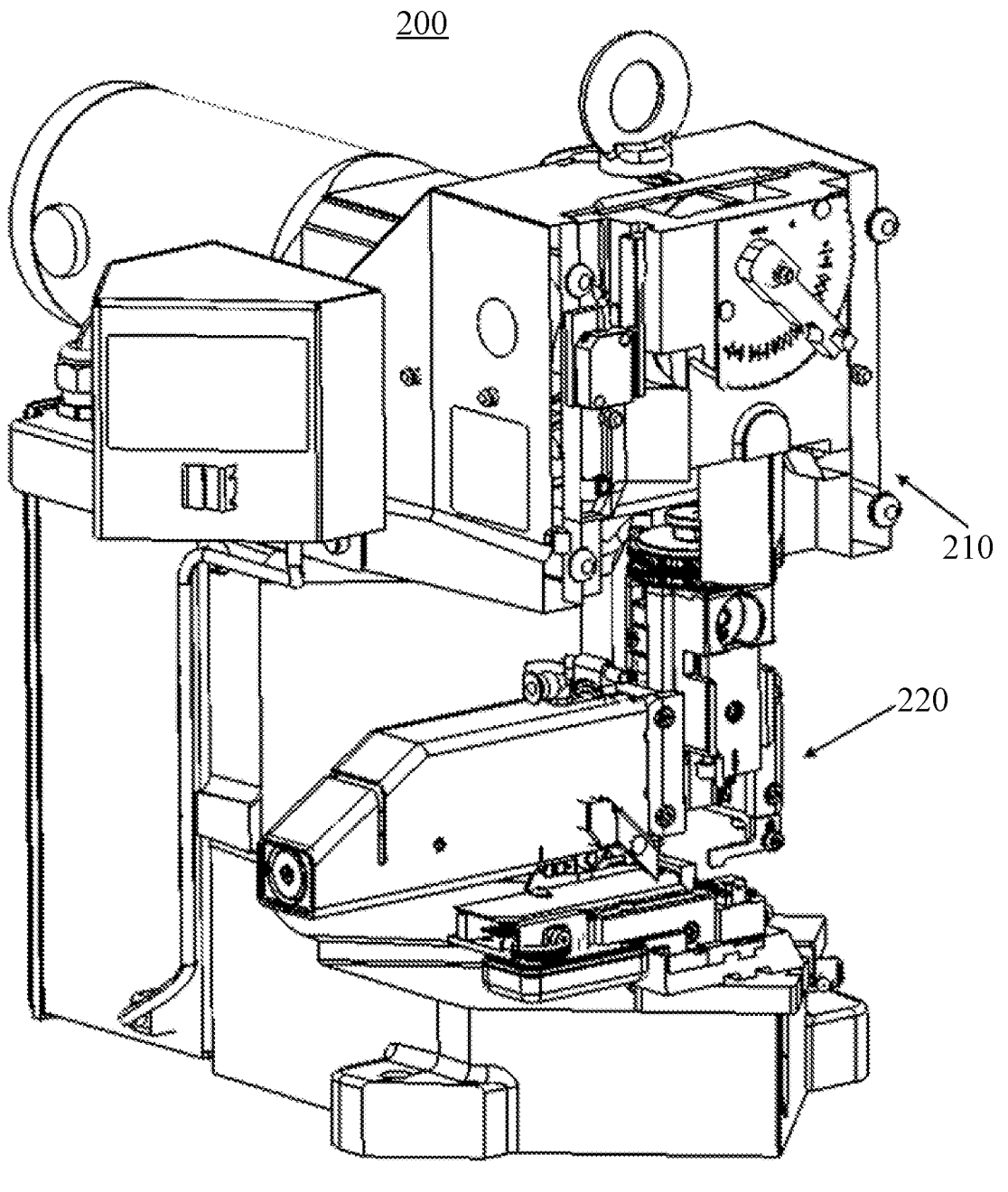
FIG. 6 is a perspective view schematically showing a configuration of an element crimping mechanism of an integrated cable processing device according to an exemplary embodiment of the present disclosure.

As shown in FIG. 4, the cable clamping mechanism 110 may include a base frame 111 and a clamp 112 mounted on the base frame 111. The base frame 111 extends in a vertical direction and is movably and/or rotatably mounted on the first guide rail 120. The clamp 112 is configured to clamp the cable 10. The base frame 111 can be driven to move along the first guide rail 120 by a driving mechanism 130, such as a motor.

In some examples, the size or length of the base frame 111 in the vertical direction can be adjusted to adjust the height of the clamp 112. In this way, the clamped cable 10 may be adjusted to be at the same height as the cable processing position of the corresponding cable processing mechanism.

According to an exemplary embodiment of the present disclosure, as shown in FIGS. 2-3 and 5-6, a plurality of cable processing mechanisms provided on the workbench 102 may include an element crimping mechanism 200 configured to crimp conductive elements, such as conductive terminals, contacts or connectors, on the core conductor 12 at the sub segment 11 of the cable 10 clamped by the cable clamping assembly 100.

As shown in the figure, the element crimping mechanism 200 may include a press 210 and an applicator 220. The press 210 is adapted to crimp a suitable conductive element to the core conductor 12 of the cable 10 at the sub segment 11. The applicator 220 is adapted to wrap a tape such as a semi-conductive rubber tape and an insulating tape around the sub segment 11 to partially wrap the core conductor 12 or the crimped conductive element. The tape may come from a reel 201, which is arranged under the workbench 102, for example. It will be understood that the element crimping mechanism 200 provided in the integrated cable processing device according to the embodiment of the present disclosure may be a conventional element crimping mechanism known in the art, and its specific structure will not be described in detail herein.

According to an exemplary embodiment of the present disclosure, as shown in FIGS. 2-3 and 7-8, a plurality of cable processing mechanisms provided on the workbench 102 may include a braid flaring mechanism 300 for flaring the braid 14 at the sub segment 11 of the cable 10 clamped by the cable clamping assembly 100. FIG. 9 schematically shows a cable 10 in which the braid 14 has been flared. It will be understood that the braid flaring mechanism 300 provided in the integrated cable processing device according to the embodiment of the present disclosure may be a conventional braid flaring mechanism known in the art, and its specific structure will not be described in detail herein.

Figure 7:
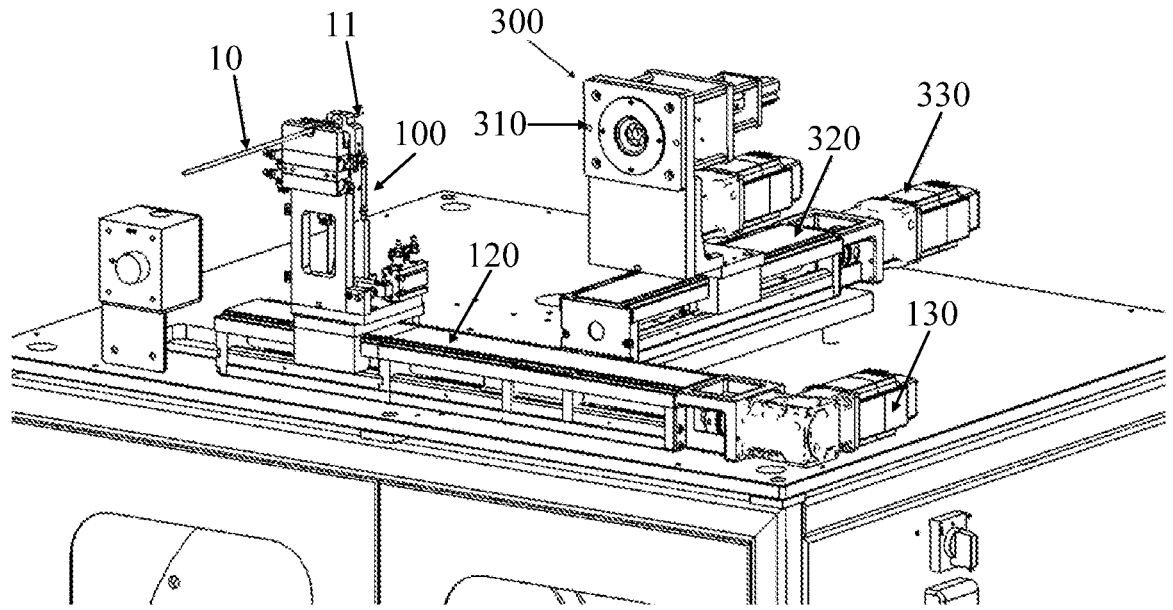
FIG. 7 is a perspective view schematically showing a partial structure of an integrated cable processing device according to an exemplary embodiment of the present disclosure, in which the cover is removed to show a cable clamping assembly and a braid flaring mechanism aligned with each other.
Figure 8:
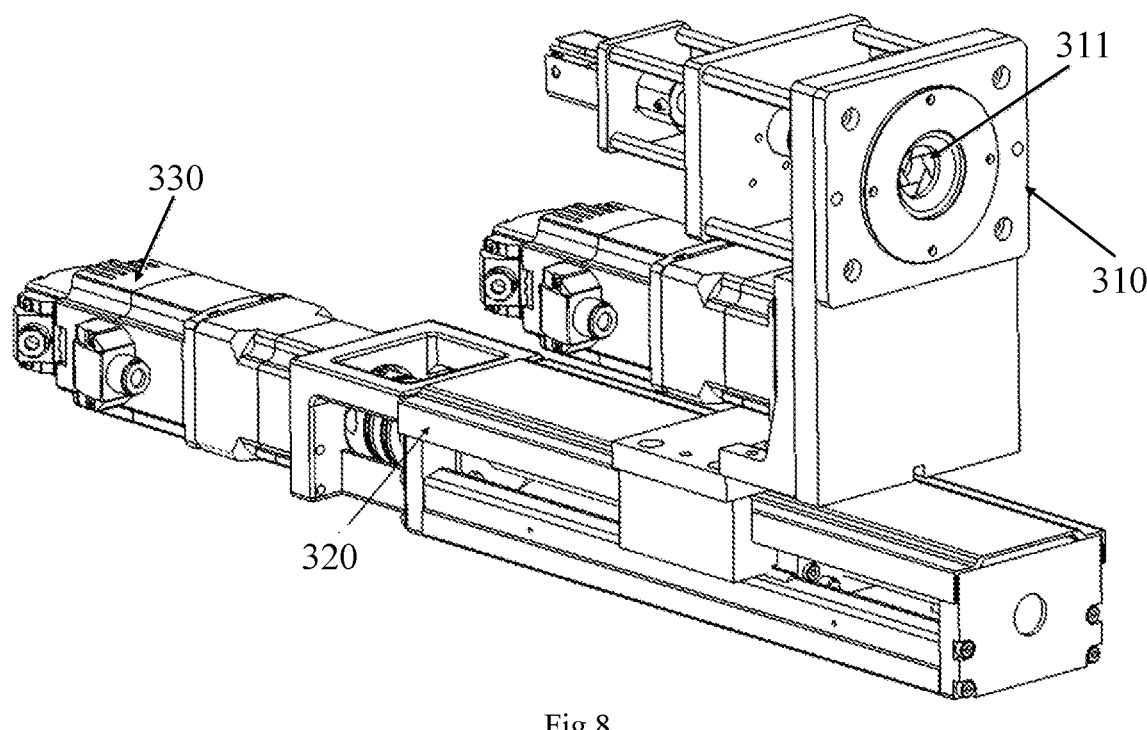
FIG. 8 is a perspective view schematically showing a configuration of a braid flaring mechanism of an integrated cable processing device according to an exemplary embodiment of the present disclosure.
Figure 9:
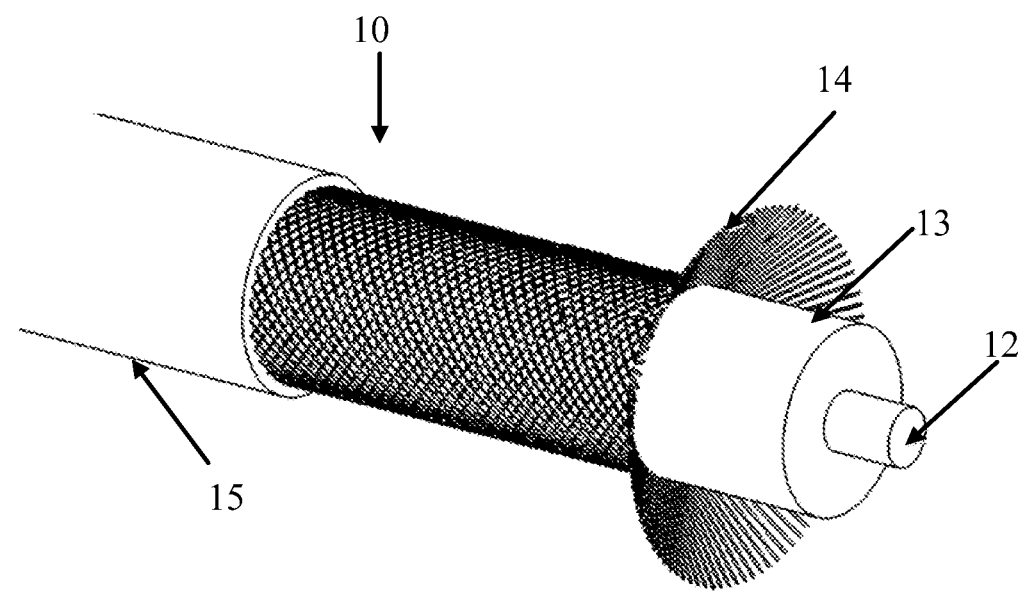
FIG. 9 schematically shows an example of a cable in which the braid has been flared.

In the illustrated embodiment, as shown in FIGS. 7-8, the braid flaring mechanism 300 includes a braid flaring tool 310 and a second guide rail 320. The braid flaring tool 310 is adapted to flare a predetermined length of braid 14 at the sub segment 11 of the cable 10 clamped by the cable clamping assembly 100 to facilitate subsequent processing operations. The second guide rail 320 is installed on the workbench 102, and the braid flaring tool 310 is installed on the second guide rail 320 and can move relative to the second guide rail 320 to adjust the spacing between the braid flaring tool 310 and the sub segment 11 of the cable 10 clamped by the cable clamping assembly 100, so as to adjust the length of the braid layer expected to be flared. For example, the braid flaring tool 310 may be driven to move or slide along the second guide rail 320 by a driving mechanism 330, such as a motor. The braid flaring tool 310 may have a hole cavity 311 for inserting the sub segment 11 of the cable, and a structure such as a blade for flaring the braid layer may be arranged in the hole cavity.

According to an exemplary embodiment of the present disclosure, as shown in FIGS. 2-3 and 10-11, a plurality of cable processing mechanisms provided on the workbench 102 may include a foil removing mechanism 400 configured to cut and remove the metal foil layer 13 exposed at the sub segment 11 of the cable 10 clamped by the cable clamping assembly 100, such as aluminum foil. It will be understood that the foil removing mechanism 400 provided in the integrated cable processing device according to the embodiment of the present disclosure may be a conventional foil removing mechanism known in the art, and its specific structure will not be described in detail herein.

Figure 10:
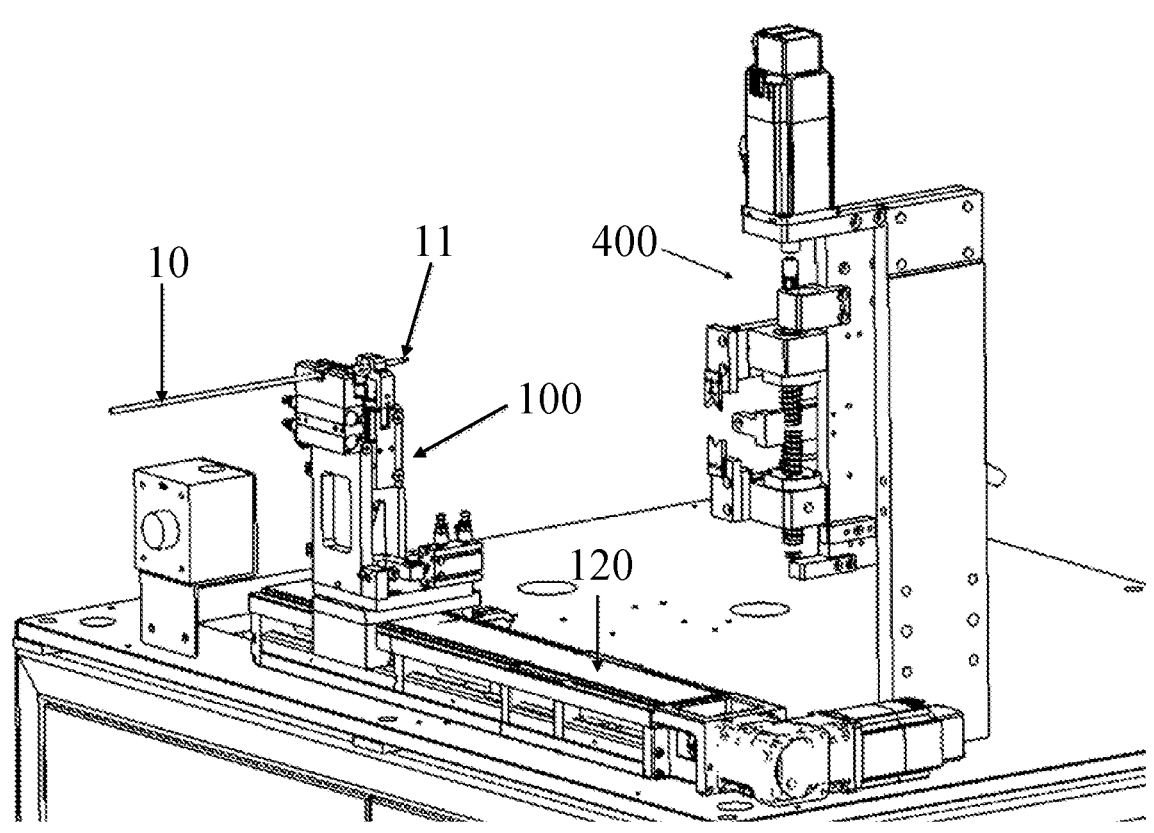
FIG. 10 is a perspective view schematically showing a partial structure of an integrated cable processing device according to an exemplary embodiment of the present disclosure, in which the cover is removed to show a cable clamping assembly and a foil removing mechanism aligned with each other.
Figure 11:
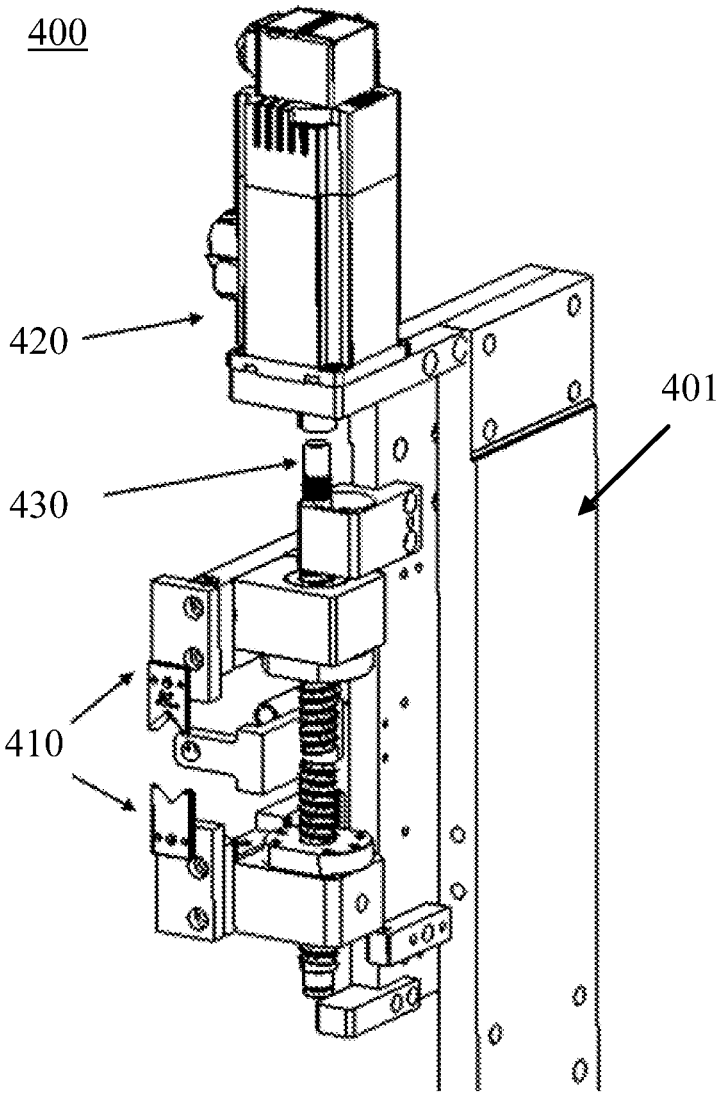
FIG. 11 is a perspective view schematically showing a configuration of a foil removing mechanism of an integrated cable processing device according to an exemplary embodiment of the present disclosure.

In the illustrated embodiment, as shown in FIGS. 10-11, the foil removing mechanism 400 includes a support 401 mounted on the workbench 102 and a cutting mechanism 410 mounted to the support 401. The cutting mechanism 410 includes a pair of cutters opposite in the up-down direction for cutting the metal foil layer 13 along the circumference of the cable 10. The cutting mechanism 410 may be driven by a driving mechanism 420 such as a motor to perform a cutting operation. For example, the foil removing mechanism 400 may be provided with a screw rod 430 connected to the cutter, the driving mechanism 420 drives the pair of cutters to move close to each other in the up-down direction to cut the metal foil layer 13 or drives the pair of cutters to move away from each other in the up-down direction to release the cable 10.

According to an exemplary embodiment of the present disclosure, the integrated cable processing device may also include a controller 109, such as a processor or PLC, which is configured to control the cable clamping assembly 100 to automatically move to a position aligned with one or more of the plurality of cable processing mechanisms in a condition where the cable clamping assembly 100 clamps the cable 10, and control the cable processing mechanism to automatically perform the corresponding processing operation on the sub segment 11 of the cable 10. In FIG. 1, the controller 109 is schematically shown in the workbench 102.

In some exemplary embodiments, as shown in FIG. 1, the integrated cable processing device may also include a hood or cover 103 mounted to the frame 101 to define a working cavity between the cover 103 and the workbench 102. The plurality of cable processing mechanisms 200, 300, 400 and the cable clamping assembly 100 are provided in the working cavity.

In some exemplary embodiments, as shown in FIG. 1, the integrated cable processing device may also include a user interface 104 and/or a status indicator 105. The user interface 104 may include, for example, an HMI configured to allow the user to select and configure at least one of a variety of processing operations that can be performed by the integrated cable processing device via the user interface 104, or display the status or result of the processing operation. The status indicator 105 may be used to indicate the processing operation status of the integrated cable processing device. One or more buttons 108 may also be provided to operate the integrated cable processing device, such as starting a corresponding processing operation. As shown in

6

FIG. 1, the user interface 104, the status indicator 105, and the button 108 may be provided on the cover 103.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An integrated cable processing device comprising:
   a frame defining a workbench;
   a plurality of cable processing mechanisms provided on the workbench and configured to respectively and successively perform different processing operations on the cable, wherein each of the processing operations include at least one of stripping, cutting, removing, flaring, and crimping performed on the cable; and
   a cable clamping assembly configured to clamp the cable, the cable clamping assembly is configured to be movable relative to the plurality of cable processing mechanisms to successively move a sub segment to be processed of the clamped cable to each of the plurality of cable processing mechanisms, and each cable processing mechanism performs the corresponding processing operation on the sub segment, the cable clamping assembly comprises:
   a cable clamping mechanism configured to clamp the cable; and
   a first guide rail installed on the workbench, the cable clamping mechanism is movably installed on the first guide rail and is capable of being driven to move along the first guide rail, so as to move the sub segment to be processed of the clamped cable to the corresponding cable processing mechanism, the cable clamping mechanism is configured to be rotatable relative to the first guide rail to adjust the orientation of the sub segment to be processed of the clamped cable.

2. The integrated cable processing device according to claim 1, wherein the first guide rail comprises at least one of a linear guide rail and a curved guide rail.

3. The integrated cable processing device according to claim 1, wherein the cable clamping mechanism comprises:

a base frame movably and/or rotatably mounted on the first guide rail; and a clamp installed on the base frame and configured to clamp the cable.

4. The integrated cable processing device of claim 3, wherein a size of the base frame in a vertical direction is adjustable, and a height of the clamp is capable of being adjusted by adjusting the size of the base frame.

5. The integrated cable processing device of claim 4, wherein the clamped cable is capable of being adjusted to be at the same height as a cable processing position of the corresponding cable processing mechanism by adjusting the height of the clamp.

6. The integrated cable processing device according to claim 1, wherein the plurality of cable processing mechanisms are arranged at intervals on the same side or different sides of the cable clamping assembly.

7. The integrated cable processing device according to claim 1, wherein the plurality of cable processing mechanisms include an element crimping mechanism configured to crimp a conductive element on a core conductor at the sub segment of the cable clamped by the cable clamping assembly.

8. The integrated cable processing device according to claim 1, wherein the plurality of cable processing mechanisms include a braid flaring mechanism configured to flare a braid at the sub segment of the cable clamped by the cable clamping assembly.

9. The integrated cable processing device according to claim 8, wherein the braid flaring mechanism comprises:

a braid flaring tool configured to flare a predetermined length of braid at the sub segment of the cable clamped by the cable clamping assembly; and a second guide rail installed on the workbench.

10. The integrated cable processing device according to claim 9, wherein the braid flaring tool is installed on the second guide rail and configured to be movable relative to the second guide rail to adjust a spacing between the braid flaring tool and the sub segment of the cable clamped by the cable clamping assembly.

11. The integrated cable processing device according to claim 1, wherein the plurality of cable processing mechanisms include a foil removing mechanism configured to cut and remove a metal foil layer at the sub segment of the cable clamped by the cable clamping assembly.

12. The integrated cable processing device according to claim 11, wherein the foil removing mechanism comprises:

a support mounted on the workbench;

a cutting mechanism mounted to the support and comprising a pair of cutters opposite in the up-down direction for cutting the metal foil layer along a circumference of the cable; and a driving mechanism configured to drive the pair of cutters to move close to each other in the up-down direction to cut the metal foil layer or move away from each other to release the cable.

13. The integrated cable processing device according claim 1, further comprising a controller configured to control the cable clamping assembly to automatically move to a position aligned with one or more of the plurality of cable processing mechanisms in a condition where the cable is clamped by the cable clamping assembly, and control the cable processing mechanism to automatically perform the corresponding processing operation on the sub segment.

14. The integrated cable processing device according to claim 1, further comprising a cover mounted to the frame to define a working cavity between the cover and the workbench, wherein the plurality of cable processing mechanisms and the cable clamping assembly are provided in the working cavity.

15. The integrated cable processing device according to claim 1, further comprising a user interface configured to allow a user to select and configure at least one of the plurality of processing operations via the user interface.

16. The integrated cable processing device according to claim 15, further comprising a status indicator indicating a processing operation status of the integrated cable processing device.

17. The integrated cable processing device according to claim 1, wherein the frame is movable.

18. An integrated cable processing device comprising:

a frame defining a workbench;

a plurality of cable processing mechanisms provided on the workbench and configured to respectively and successively perform different processing operations on the cable, wherein each of the processing operations include at least one of stripping, cutting, removing, flaring, and crimping performed on the cable; and a cable clamping assembly configured to clamp the cable, the cable clamping assembly is configured to be movable relative to the plurality of cable processing mechanisms to successively move a sub segment to be processed of the clamped cable to each of the plurality of cable processing mechanisms, and each cable processing mechanism performs the corresponding processing operation on the sub segment, the cable clamping assembly comprises:

a cable clamping mechanism configured to clamp the cable, comprising:

a base frame movably and/or rotatably mounted on the first guide rail, a size of the base frame in a vertical direction is adjustable; and a clamp installed on the base frame and configured to clamp the cable, a height of the clamp is capable of being adjusted by adjusting the size of the base frame; and a first guide rail installed on the workbench, the cable clamping mechanism is movably installed on the first guide rail and is capable of being driven to move along the first guide rail, so as to move the sub segment to be processed of the clamped cable to the corresponding cable processing mechanism.

19. The integrated cable processing device according to claim 18, wherein the cable clamping mechanism can clamp the cable at a predetermined distance from an end of the cable, so that the sub segment has a predetermined length.

* * * * *